United States Patent
Lindhorst-Ko et al.

(10) Patent No.: US 6,853,641 B2
(45) Date of Patent: Feb. 8, 2005

(54) METHOD OF PROTECTING TRAFFIC IN A MESH NETWORK

(75) Inventors: Gwenda Lindhorst-Ko, Ottawa (CA); Waichi Lo, Kanata (CA); Michel Dallaire, Aylmer (CA)

(73) Assignee: Nortel Networks Limited, St. Laurent (CA)

(*) Notice: Subject to any disclaimer, the term of this patent is extended or adjusted under 35 U.S.C. 154(b) by 709 days.

(21) Appl. No.: 09/739,711

(22) Filed: Dec. 20, 2000

(65) Prior Publication Data

US 2002/0075873 A1 Jun. 20, 2002

(51) Int. Cl.⁷ .............................................. H04L 12/50
(52) U.S. Cl. .................. 370/394; 370/406; 370/395.71
(58) Field of Search ............................... 370/353–356, 370/380–391, 394–396, 401–406, 338, 392, 218–220, 397, 395.71, 412–418

(56) References Cited

U.S. PATENT DOCUMENTS

| | | | | |
|---|---|---|---|---|
| 5,337,313 A | * | 8/1994 | Buchholz et al. | 370/394 |
| 5,561,661 A | * | 10/1996 | Edmaier et al. | 370/394 |
| 5,848,228 A | * | 12/1998 | Simatic et al. | 714/4 |
| 5,883,891 A | * | 3/1999 | Williams et al. | 370/356 |
| 6,091,725 A | * | 7/2000 | Cheriton et al. | 370/392 |
| 6,246,681 B1 | * | 6/2001 | Humphrey et al. | 370/389 |
| 6,373,821 B2 | * | 4/2002 | Staats | 370/252 |
| 6,466,574 B1 | * | 10/2002 | Fujisaki et al. | 370/356 |
| 6,466,576 B2 | * | 10/2002 | Sekine et al. | 370/395.1 |
| 6,678,267 B1 | * | 1/2004 | Anandakumar et al. | 370/356 |

OTHER PUBLICATIONS

Andreas Iselt, "A New Synchronization Algorithm for Hitless Protection Switching in ATM Networks", Munich University of Technology, Institute of Communication Networks, Munchen, Germany; pp 370 to 376.

* cited by examiner

Primary Examiner—Douglas Olms
Assistant Examiner—Van Nguyen
(74) Attorney, Agent, or Firm—Max R. Wood; Ogilvy Renault (57) ABSTRACT

Method and apparatus for protection of traffic in a mesh network are disclosed. A source node sends duplicate copies of data packets of the protected traffic on physically diverse paths through the network. The data packets include a sequence number for determining their position in the protected traffic. A destination node receives the data packets from the paths, selects the next data packet in the sequence and transfers that packet to a receiving queue, while duplicate packets are discarded, and later packets in the sequence are held in a holding queue for future selection. The method does not require a synchronization function between the paths to perform a switchover in the event of a fault, and therefore the method is simple to implement. The method is also scalable to provide multiple physically diverse paths in order to achieve greater degrees of protection.

12 Claims, 8 Drawing Sheets

METHOD OF PROTECTING TRAFFIC IN A MESH NETWORK

FIELD OF THE INVENTION

This invention relates to the protection of traffic in a mesh network, and more particularly to the protection of traffic in a mesh network by using physically diverse transmission paths.

BACKGROUND OF THE INVENTION

Communications networks can suffer from failures or service degradation, both of which often cause tangible losses to users as well as the network providers. Redundant transmission on physically diverse paths is a common precaution against the effects of failures in communication networks. Hereinafter, physically diverse is defined as meaning that a single failure will affect only one given path. In optical fiber networks the restoration time must be as short as possible since line bit rates are very high. Furthermore, some services require a high degree of reliability because they may be adversely affected by any amount of bit loss. For these types of services, protection switching without bit loss (hitless protection switching, hereafter) is desired.

Typically, in a communication network a very small portion of the traffic requires highly reliable service, such as voice and video traffic. In some cases, for example with 911 services, the traffic is fault intolerant in that it cannot afford to have call set up failure or to be dropped, and hence requires hitless switching. In a mesh network, extremely fast restoration would be required to prevent such calls from being dropped in the case of a fault. In other cases, a customer may be willing to pay for a higher degree of reliability (e.g. for mission critical applications) and in these cases it may also be desirable to provide hitless protection switching.

Known approaches that provide hitless switching usually involve error detection, synchronization, and selection algorithms. For example, in a paper entitled "A New Synchronization Algorithm for Hitless Protection Switching in ATM Networks" in IEEE paper 0-7803-525-0/99 by Andreas Iselt, a method of hitless protection switching is described. Synchronization of the two data streams is an important aspect of the method and involves three phases: a hunt phase, a validation phase and a monitoring phase. While the method described by Iselt provides adequate synchronization for hitless switching, it may be quite complex to implement. Furthermore, it is not easily adapted to provide greater protection, for example using more than two paths, which could be useful for 911 services for example, to protect against multiple faults in the network.

Therefore, a method of protecting traffic that is simple to implement and is scalable for selectable degrees of reliability against network faults is desired.

SUMMARY OF THE INVENTION

It is an object of the present invention to provide an improved method of protecting traffic in a mesh network.

The method is based on multiple physically diverse paths, each of the paths carrying data packets that have been duplicated in each of the other paths. That is, to achieve protection in the packet layer, a source node transmits the same data onto at least two physically diverse paths. A destination node receives the data packets and discards duplicate packets. The number of paths may be increased to achieve more reliability, but the paths must be physically diverse, as previously defined. Hence, the additional bandwidth required for providing protection for the traffic is dependent on the reliability desired and on the amount of protected traffic.

At the destination node, embodiments of the invention use only packet selection and packet sequencing functions, and do not require the synchronization function of the prior art. The selection function is based on the expected sequence number of the next packet. This tends to favour packets from the leading path, but will select packets from any one of the other paths in the case of a fault, or a delay, on the leading path. In effect, packets are received from the paths, the next packet in the sequence is selected and transferred to the receiving queue of the destination node, while duplicate packets are discarded and future packets in the sequence are held in a holding queue for later selection.

According to an aspect of the present invention there is provided a method of protecting traffic in a mesh network, the method comprising the steps of establishing at least two physically diverse paths from a source node to a destination node for transmitting data packets of the traffic; tagging, at the source node, each of said data packets with a sequence number; transmitting, by the source node, the tagged data packets onto the paths; receiving, at the destination node, the data packets transmitted over the paths; and reconstructing, at the destination node, the traffic from the received data packets.

According to another aspect of the present invention there is provided a method of receiving traffic in a mesh network, the method comprising the steps of establishing at least two physically diverse paths from a source node to a destination node for carrying data packets of the traffic; receiving, at the destination node, the data packets transmitted over the paths; and reconstructing, at the destination node, the traffic from the received data packets.

According to still another aspect of the present invention there is provided a network node for receiving protected traffic carried over physically diverse paths in a mesh network, the node comprising a plurality of receivers, each one of said receivers for connecting to one of the paths and being operable to receive data packets of the traffic, each of said data packets having a sequence number corresponding to its position in the traffic; a controller being operable to maintain an expected sequence number, the expected sequence number corresponding to the position in the traffic of a next data packet to be received; and a receiving queue for receiving the data packets. The controller is operable to cause a particular data packet to be delivered from any one of the receivers to the receiving queue responsive to the particular data packet having a sequence number equal to the expected sequence number.

Advantages of embodiments of the invention are that they are scalable to provide multiple protection paths, and therefore greater protection, and are simple to implement since synchronization of data streams at the destination node is not required.

BRIEF DESCRIPTION OF THE DRAWINGS

The invention will be further understood from the following detailed description of embodiments of the invention with reference to the accompanying drawings, in which.

DETAILED DESCRIPTION

Figure 1:
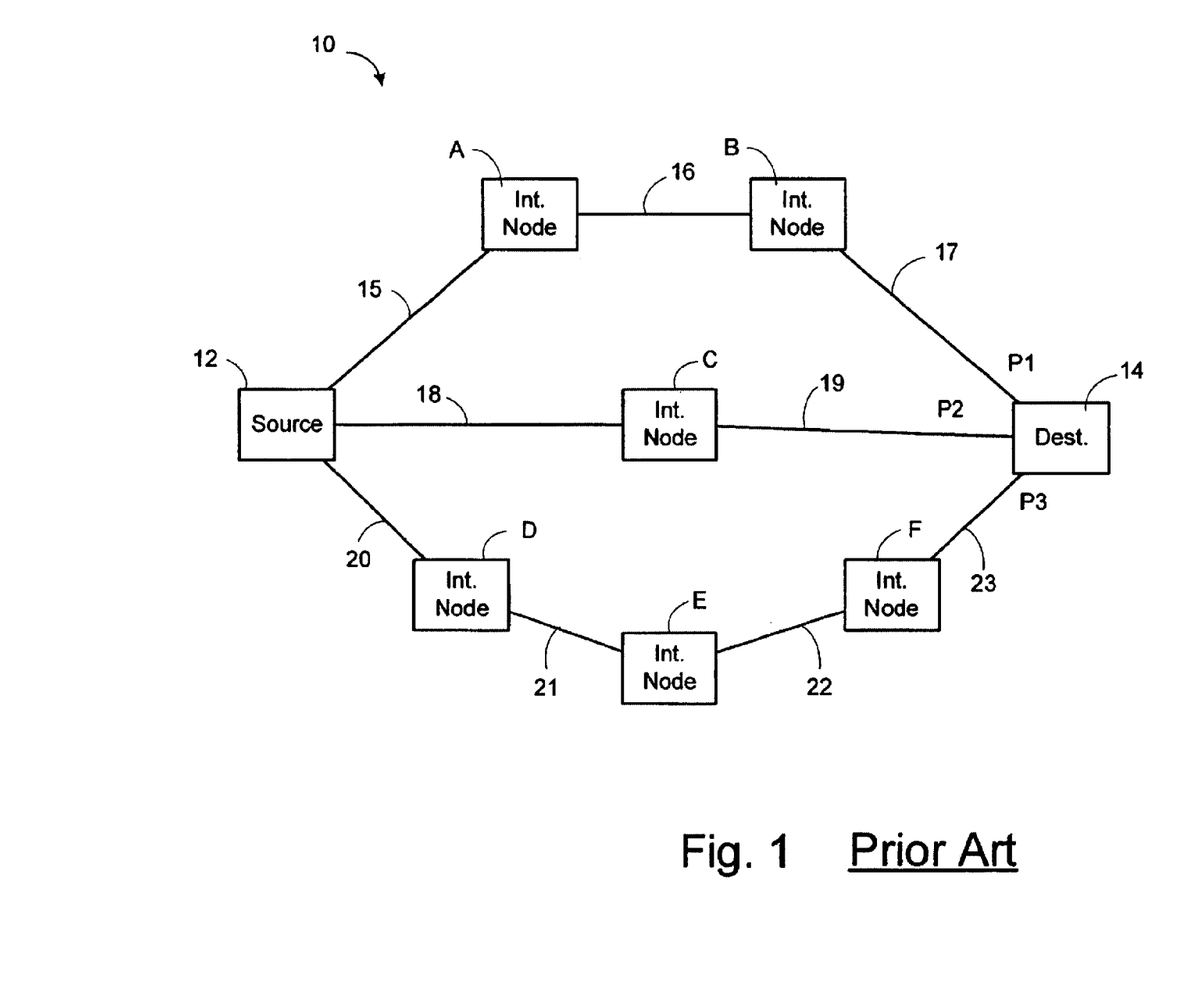
FIG. 1 is a diagram of a mesh network.

Referring to FIG. 1, a mesh network 10 for carrying data traffic, for example IP traffic, includes a source node 12 and destination node 14, which could be MPLS enabled IP routers for example. Three physically diverse paths P1, P2, and P3 are available to carry traffic between the source node 12 and the destination node 14. The first path P1 carries traffic through intermediate nodes A and B over links 15,16, and 17, which interconnect the intermediate nodes A and B to the source and destination nodes 12, 14. These links could be SONET links for example. The second path P2 carries traffic through an intermediate node C over the links 18 and 19, which interconnect the intermediate node C to the source and destination nodes 12, 14. The third path P3 carries traffic through three intermediate nodes D, E, and F over the links 20, 21, 22, and 23, which interconnect the intermediate nodes (D, E, and F) to the source and destination nodes 12, 14. The source, destination, and intermediate nodes are interconnected via the transmission links (15 to 23) to form a mesh communication network 10, such that the three physically diverse paths (P1, P2, and P3) can be established, thereby allowing the flow of traffic in the form of data packets from the source node 12 to the destination node 14 and vice versa.

Protection of the traffic is based on multiple paths carrying duplicate data, for example paths P1, P2, and P3. Achieving 1+1 protection in the packet layer requires multicasting from the source node 12 onto at least two physically diverse paths. The destination node 14 is responsible for discarding duplicate packets. The number of physically diverse paths can be increased to achieve more reliability. This can be done on an "as needed" basis for a given user, or a period of time, or even for a portion of a path between the destination and source nodes. The bandwidth required for the protected traffic is dependent on the reliability desired, which affects the number of paths carrying duplicated data, and hence the overall bandwidth consumed by the protection scheme. However, services requiring high reliability (e.g. 911 services) typically constitute a very small portion of the network data traffic. Additional high-priority services may also include other types of voice and video traffic. Other mesh protection schemes could also be used in the network.

Since the present method of protection uses physically diverse paths it does not rely on mesh restoration. The method requires that the source node 12 and destination node 14 be able to perform multicast, sequencing, packet selection, and discard functions, as will be described later. The multicast function is understood to mean that data packets sent over physically diverse paths will have the same data payload, and the same sequence number, but will have a different label identifier (e.g. a different label shim in the case of multi-protocol label switching (MPLS) protocol). The rest of the network nodes (i.e. apart from the source and destination nodes) could be generic routers, for example, ones with MPLS capability. The method of protection does not require fault notification, hence inter-working between open system interconnection (OSI) layer 0 and layer 3 is not required. When a path does fail, the routers would eventually determine the failure, or fault notification could be obtained from the lower layers. However, the fault notification does not need to be fast since the present method of protection is not dependent on the fault notification.

There may be N different routes between a given source node 12 and destination node 14. If there is a requirement for very high reliability (e.g. 911 services) and the ability to handle multiple simultaneous faults, then N will be a large number. For less critical data, or for data that does not require protection, N equals one. Data packets of the traffic requiring protection are multicast onto each of the N routes. If N equals 2, this would be equivalent to 1+1 protection at layer 1. However, this would only protect against one path experiencing a fault. In order to cover multiple fault scenarios, N needs to be increased.

An advantage of the present method of protection is that it is a path protection scheme, rather than a link protection scheme. Hence, the method uses less bandwidth than the corresponding 1+1 layer 1 SONET rings. Furthermore, if only a portion of the data packets being transmitted over a link are protected, then the method requires less protection bandwidth than link protection schemes. Therefore, the cost of protection is directly proportional to the desired quality of service of the traffic being carried and not to the bit rate of the links. Consequently, the cost, in terms of bandwidth, of protecting the protected traffic remains the same when the links are upgraded (e.g. OC48 to OC192). In the case of protection against multiple faults, since more paths are required, the bandwidth requirements for the protected traffic increases as the number of paths are increased. However, typically the proportion of protected traffic relative to unprotected traffic on the link would be relatively small. By protecting only a portion of the link traffic the savings in bandwidth could provide higher reliability of traffic selected for protection at the same cost as link protection schemes, albeit only for the selected traffic. For example, if the protected traffic represents only 10 percent of the link bandwidth, then there can be 10 protection paths before the same bandwidth as a link protection scheme is used.

A further advantage of the present method of protection is that it is resilient to intermittent failures and "brownout" failures, as well as hard failures (e.g. fiber cuts), and transient failures, which cause link switchovers. As such, hold-off requirements to ensure the existence of a failure before a switchover is implemented are not required. Furthermore, the present method of protection provides a means of surviving multiple simultaneous failures and allowing for high priority traffic to continue as the network degrades gracefully with an increased number of simultaneous failures. Since the present method of protection allows for different levels of reliability by providing different numbers of paths, lower priority traffic will be affected first before higher priority traffic is affected, as the network degrades under multiple simultaneous failures. Still further, the present method provides the capability of adding more paths for high priority traffic, thereby enhancing the capability of the network to provide protection to high priority traffic.

Figure 2:
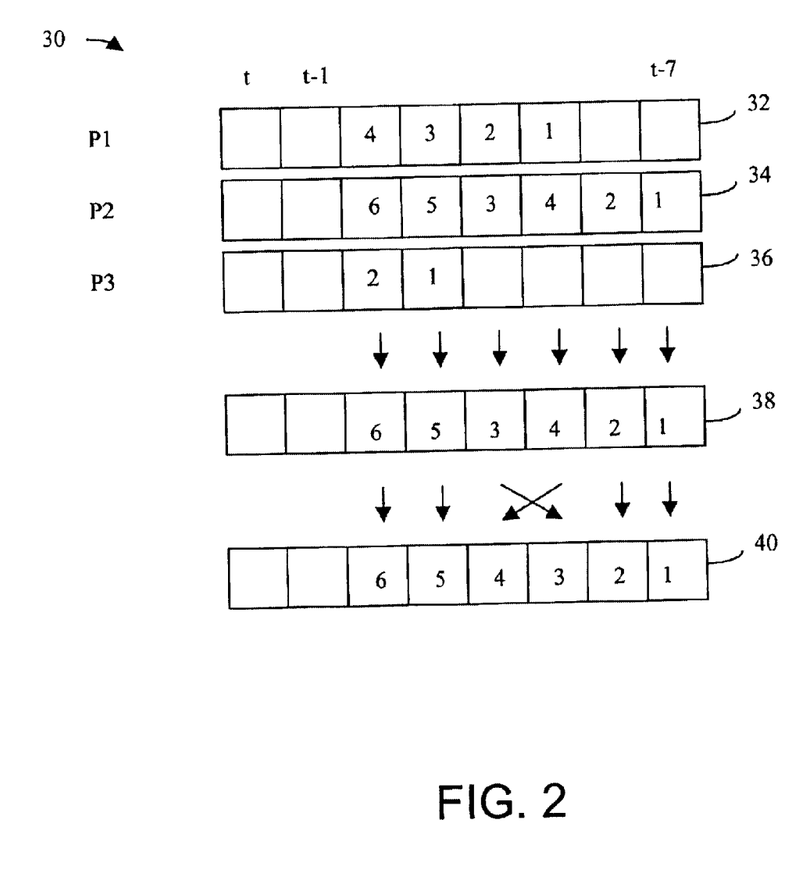
FIG. 2 is a diagram representing the queues at the destination node according to a first embodiment of the invention.

Referring to FIG. 2, which represents queues at the destination node according to a first embodiment of the invention, an overview of receiving data packets and reconstructing traffic at the destination node will be given. Data packets are received from the source node 12 and stored in queues 30 at the destination node 14. Path queues 32, 34, and 36 represent the queues corresponding to the first path P1, second path P2, and third path P3, respectively. Packets are stored in the path queues according to the order in which they are received, with the earliest packets received at time t-7 and the most recent packets received at time t. The destination node 14 receives the data packets from each of the incoming paths (P1, P2, and P3), but only accepts a packet onto a holding queue 38 if it has not yet received a packet with the same sequence identifier (ID) and label switched path (LSP) ID. The destination node 14 discards duplicate packets. Comparison of the data packets is based on the LSP ID and a sequence number assigned to each packet. The destination node 14 does any necessary reordering of packets when placing them into a receiving queue 40.

Referring to FIG. 2, the path queue 34 for the second path P2 receives packets 1 through 6 starting at time t-7. The first and second packets of this path queue 34 are immediately copied to the holding queue 38. The path queue 32 for the first path P1 receives packets 1 through 4 starting at time t-5 and the path queue 36 for the third path P3 receives the packets 1 and 2 starting at time t-3. In this example, none of the packets of the first path P1 or the third path P3 are copied to the holding queue 38. The holding queue 38 has packets 3 and 4 interchanged in order, since they were received in this order, and the destination node 14 re-orders these packets when copying them to the receiving queue 40.

If a fault occurs on one of the paths, the other paths that do not have a fault will continue to carry packets. For example, if a fault occurred on the second path P2, then packets from the first path P1 and the third path P3 would be received in the path queues (32 and 36) and copied to the holding queue 38 or receiving queue 40, accordingly. In this way, the destination node 14 will continue its acceptance of new packets, and discarding of duplicate packets, as before, with no interruption to the transfer of the protected traffic.

If one of the paths is rearranged, for example via rerouting as required for network optimization or defragmentation, the packets arriving at the destination node 14 from that path may be out of order. However, the other unaffected paths will continue to transmit, so this 'fault' in the network will be transparent to the receiving queue 40 of the destination node 14.

The present method does not address the potential need to 'remove' the failed path and allow the corresponding resources to be used for other new paths. In this case, it would be desirable to send fault notification to the source node 12.

An advantage of the present method of protection is that it effectively provides an immediate switch over from a failed path. Furthermore, the present method overcomes packet re-ordering problems, which may occur during rerouting, optimization, or de-fragmentation. Still further, the method is transparent to intermediate nodes (A-F), which means that no requirement additional to their normal functionality is required of these nodes. Only the source node 12 and destination node 14 need to be capable of performing the present method of protection. As long as MPLS paths are supported on the intermediate network nodes (A-F), these nodes need not be aware that there are multiple paths existing for this method of protection.

Figure 3:
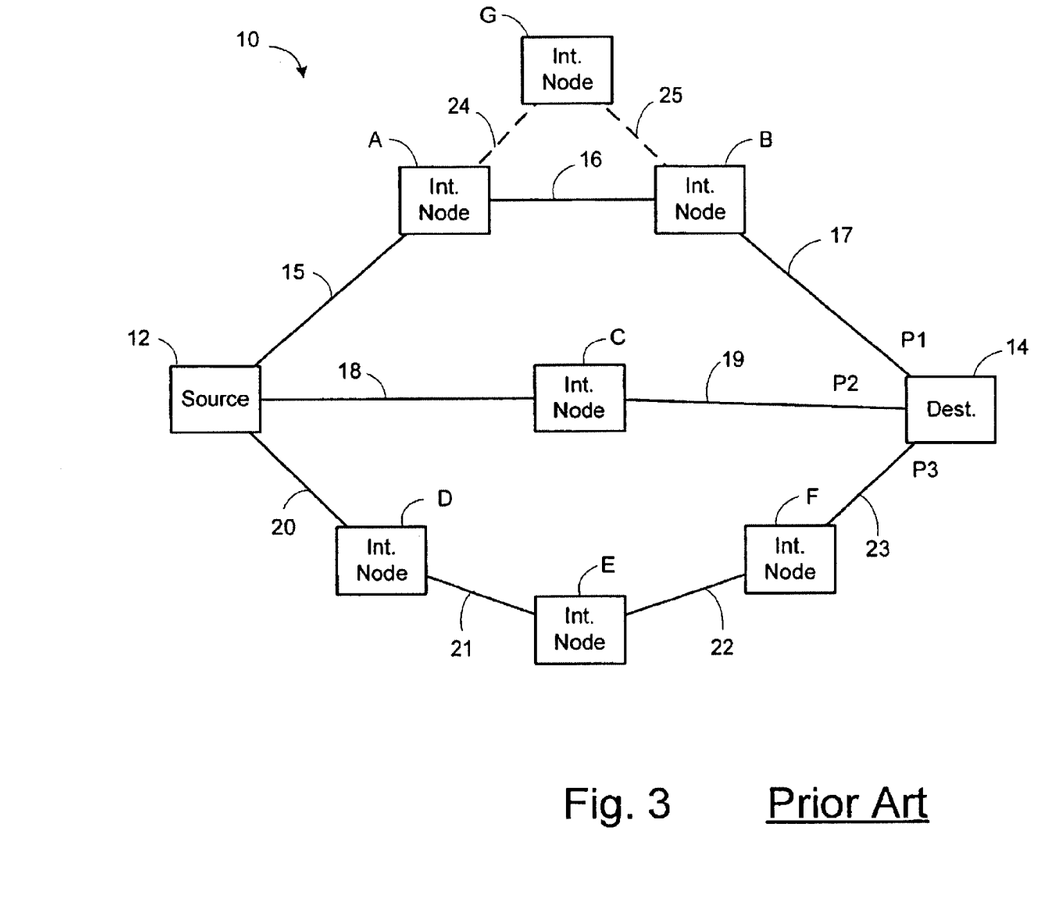
FIG. 3 is a diagram of a mesh network in another configuration.

FIG. 3 is a diagram of the mesh network in another configuration. An additional intermediate node G is shown connected between the intermediate nodes A and B, via another pair of links 24, 25 represented by dotted lines. In this case, intermediate nodes A and B must be capable of performing the method of protection. The link 16 interconnecting of the nodes A and B is to be shut down, for example, for maintenance purposes. Traffic on the first path P1 is to be routed over the intermediate node G before the link 16 is shut down. In this way, the degree of protection is maintained since, even though the link 16 is shut down, there are still three physically diverse paths for the protected traffic between the source and destination nodes 12, 14 to be transmitted over.

Figure 4:
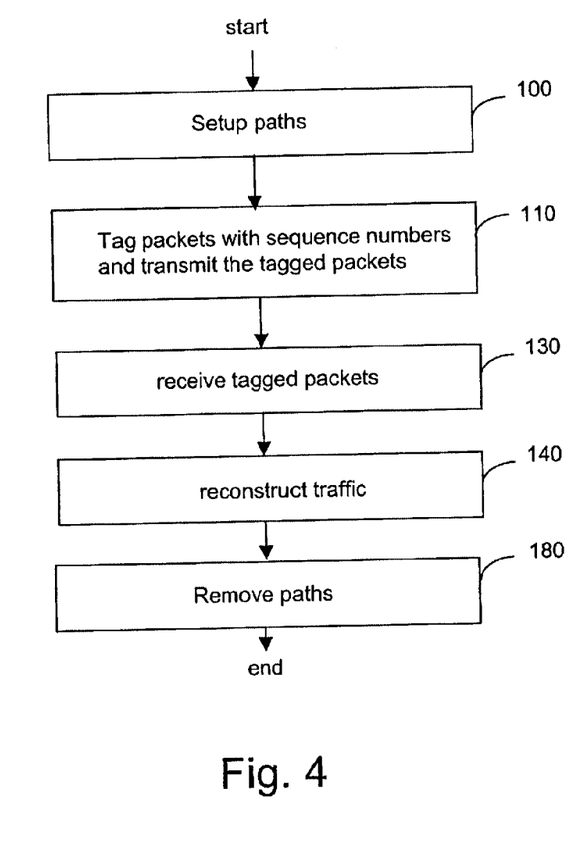
FIG. 4 is a flowchart of the method of protecting traffic according to a second embodiment of the invention.

FIG. 4 shows the general steps of the method of protecting traffic according to the second embodiment of the present invention. The method starts by establishing at least two physically diverse paths, in step 100, from the source node 12 to the destination node 14 for transmitting data packets of the traffic. Next, in step 110, each of the data packets for transmission is tagged with a sequence number by the source node 12. The source node 12 transmits the tagged data packets onto the paths in step 110. Next, in step 130, the destination node 14 receives the data packets transmitted over the paths, and reconstructs the traffic from the received data packets in step 140. When traffic flow between the source node 12 and destination node 14 has ceased, the paths are removed in step 180.

It should be noted that FIG. 4 depicts a serially executed procedure for the purpose of simplifying its explanation. Of course, tagging and transmitting packets (in step 110) at the source node 12 would be executed in parallel with receiving and reconstructing traffic (in steps 130 and 140) at the destination node 14.

Figure 5:
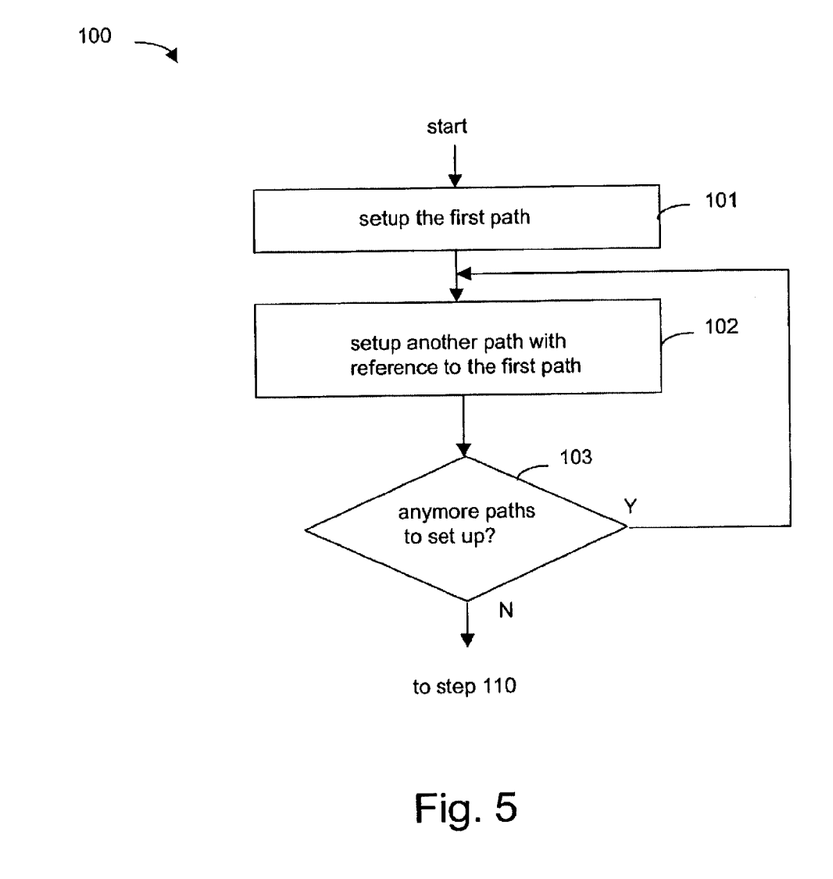
FIG. 5 is a flowchart detailing the step of setting up paths shown in FIG. 4.

Referring to FIG. 5, which shows the step 100 in greater detail, a set of physically diverse paths is established from the source node 12 to the destination node 14. The source and destination nodes 12, 14 could be MPLS routers for example. The set of paths is identified in the nodes 12, 14 as a protected set. Each path of the set is set up using a standard version of constrained route label distribution protocol (CR-LDP), or any other suitable protocol for setting up paths through the network. The paths are set up separately, with the first path P1 being set up as a normal path in step 101. When the second path P2 is set up in step 102, a reference is made to the first path P1. This is done so that the destination node 14 can associate the first path P1 with the second path P2, thereby allowing the destination node 14 to perform further steps of the method of protection to the packets received from the two paths Pi, P2. Other paths as required by step 103, for example the third path P3, are set up in a similar manner by step 102 with reference made to the first path P1 during set-up.

Figure 6:
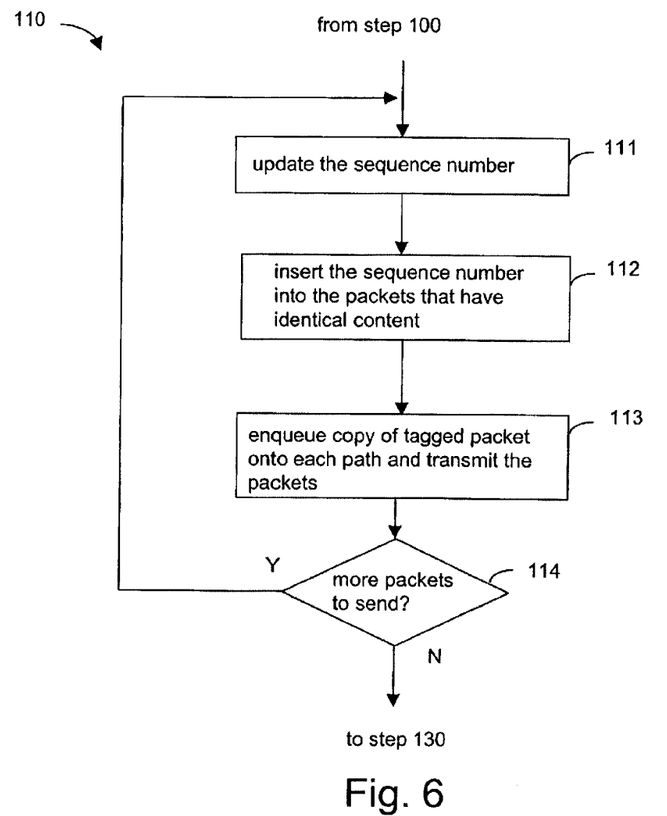
FIG. 6 is a flowchart detailing the step of tagging packets shown in FIG. 4.

Referring to FIG. 6, which shows the step 110 in greater detail, data packets for the protected traffic are tagged with sequence numbers for reconstruction. For reconstructing out of sequence packets, a 32-bit sequence number, updated in step 111, is inserted, in step 112, into the data packets before transmission. A larger sequence number could be used to accommodate higher bit rate links, for example 40 gigabit per second (Gbps) links. Updating the sequence number means incrementing the sequence number by one, but in the case of the first packet of a data stream transmission, there is no need to increment the sequence number.

A 32-bit sequence number is one that is long enough not to wraparound. It is used to accommodate a time difference of 100 milliseconds, which represents worst-case scenario in delay variance. For a 10 Gbps link and packet size of 64 bytes, there will be about $2 \times 10^{}6$ packets. A 32-bit sequence number will accommodate roughly 4×109 packets and therefore with the 100 millisecond delay variance, wrapping around of the sequence number, which causes resequencing failure, should not occur. To be compatible with the existing MPLS protocol, a sequence number, in a label shim, will be pushed onto the label stack space along with other labels on the stack. Since the set of paths P1–P3 is known to the two nodes 12 and 14, these nodes will be able to provide special treatment, in accordance with the method of protection, to packets received from these paths. Consequently, the destination node 14 will be operable to pop the label stack twice, the second pop being required to retrieve the sequence number of the data packet from the stack.

Continuing in step 110 (FIG. 6), the source node 12 enqueues a copy of tagged packets onto each path in step 113 and transmits these packets. That is, the data packets are simultaneously transmitted onto the physically diverse paths P1–P3 by the source node 12. The data packets are transmitted on the paths P1–P3 and enter the transmission stream like any other labelled packets. Responsive to more packets to be sent in step 114, execution of the method returns to updating the sequence number (step 111) if more packets are to be sent, otherwise, execution of the method proceeds to step 130 of receiving tagged packets at the destination node.

In step 130 the tagged data packets are received from the paths P1–P3. When the data packets exit from the paths P1–P3, the destination node 14 copies the received data packets into the respective path queues 32, 34, and 36, or buffers as the case may be.

Figure 7:
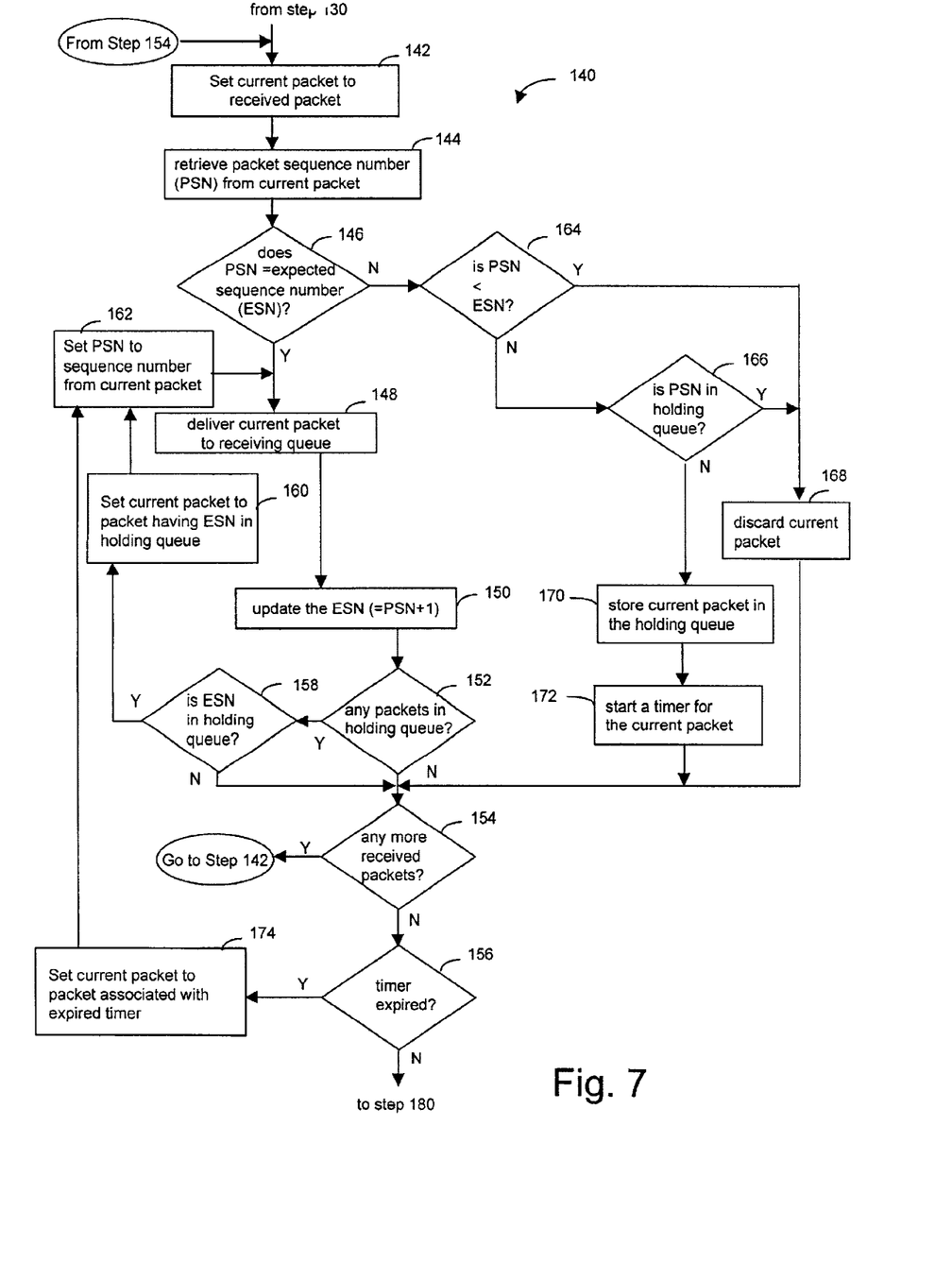
FIG. 7 is a flowchart detailing the step of reconstructing the traffic shown in FIG. 4.

Referring to FIG. 7, which shows the step 140 of reconstructing traffic in greater detail, the destination node 14 reconstructs the protected traffic from the data packets received in the step 130. In step 142 the current packet is set to a received data packet. Initially, the current packet set by the step 142 would be the first received data packet and on subsequent executions of the step 142 it would be set to the next data packet, from any of the paths. Next, in step 144, the destination node 14 retrieves the packet sequence number (PSN) from the received packet (the current packet). In step 146, if the packet sequence number of this packet equals the expected sequence number (ESN), which initially would equal the packet sequence number of the first received packet, then execution of the method proceeds to step 148 in which the current packet is delivered to the receiving queue 40. The expected sequence number is then updated (ESN= PSN+1) in step 150, by incrementing the packet sequence number by one.

Responsive to any packets being in the holding queue 38, in step 152, a determination whether or not the expected sequence number is in the holding queue 38 is made, in step 158. This is done by comparing the sequence number of each data packet in the holding queue 38 against the expected sequence number. If a data packet having a sequence number equal to the expected sequence number is in the holding queue 38, then execution of the method proceeds to step 160 of setting the current packet to the packet in the holding queue with the expected sequence number. Then in step 162, the packet sequence number is set to the sequence number from the current packet, and execution of the method proceeds to the step 148 of delivering the current packet to the receiving queue 40. However, if the expected sequence number is not in the holding queue 38, execution of the method proceeds to step 154, in which a determination of whether or not there are anymore received packets is made. Responsive to there being received packets, execution of the method proceeds back to the step 142 of setting the current packet to the next received packet. However, if there are no more received packets, execution of the method proceeds to step 156 in which a determination of whether or not a timer has expired is made.

If a timer has expired, execution of the method proceeds to step 174 in which the current packet is set to the packet associated with the expired timer. Execution of the method then proceeds to the step 162 of setting the packet sequence number to the sequence number of the current packet.

If a timer has not expired, execution of the method proceeds to step 180, shown in FIG. 4, where a determination of whether or not the paths should be taken down is made. This would typically be done by the source node 12 in the case of unidirectional transmission, and by either node in the case of bi-directional transmission. If the paths are to be taken down, the paths are removed and this is the end of the method. Otherwise, execution of the method at the destination node 14 continues from step 130 of receiving tagged packets.

Returning to step 152, if there are no packets in the holding queue, then execution of the method continues from step 154.

Returning to step 146, if the packet sequence number does not equal the expected sequence number, then execution of the method continues to step 164, and responsive to the packet sequence number being less than the expected sequence number, the current packet is discarded in step 168. Execution of the method then continues from step 154.

Responsive to the packet sequence number not being less than expected sequence number in step 164, a determination is made, in step 166, whether or not the packet sequence number is in the holding queue 38. This is done by comparing the sequence number of each data packet in the holding queue 38 against the packet sequence number. If a data packet having a sequence number equal to the packet sequence number is in the holding queue 38, then the current packet is discarded in step 168. However, if the packet sequence number is not in the holding queue 38, execution of the method proceeds to step 170, where the current packet is stored in the holding queue 38, and then a timer for the current packet is started in step 172. The value of the timer is chosen based on the performance of the network, which affects the delay variance between the paths P1–P3. For example, the value of the timer could be set to twice this delay variance. Execution of the method then continues to step 154.

Figure 8:
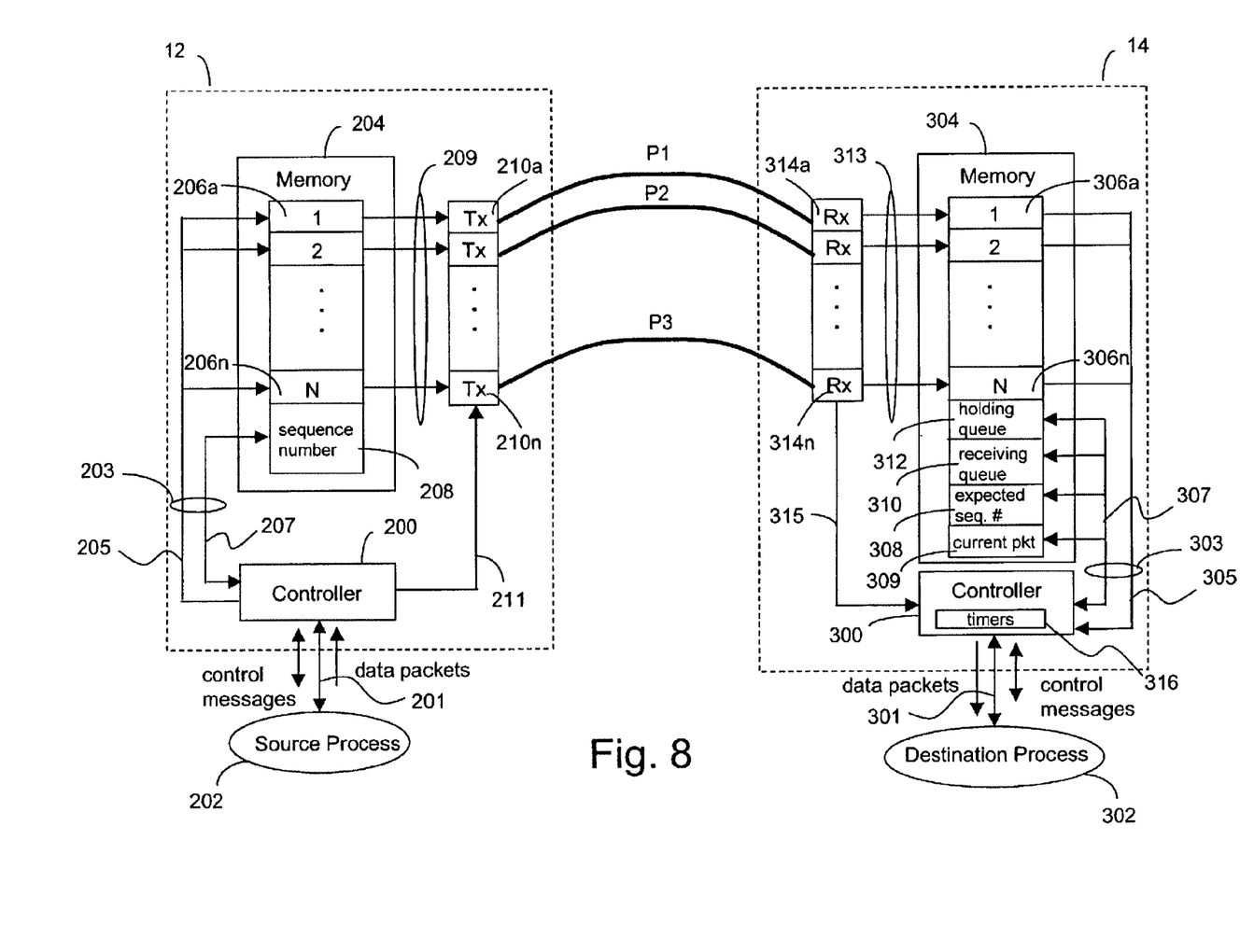
FIG. 8 is a block diagram of a portion of the source and destination nodes of FIG. 1, according to the first embodiment of the invention.

Referring to FIG. 8, which is a block diagram of portions of the source and destination nodes according to the first embodiment of the invention, more details of the structure of these nodes will now be given. The features shown in the source and destination nodes 12, 14 are for a unidirectional traffic flow across the physically diverse paths P1–P3. Of course, for bi-directional traffic flow, the source node 12 would include all the features of the destination node 14, and vice versa. The source node 12 includes a controller 200 communicatively coupled via a connection 201 to its other source processes 202 (e.g. the other protocol layers which receive data from users or other network nodes). Control messages, such as connection and flow control messages, flow over the connection 201 as well as data packets of the protected traffic. The controller 200 is bi-directionally connected via a system bus 203 to a memory 204. The system bus is operable to provide connections 205 to transmit queues 206a–206n, which are part of the memory 204. The system bus 203 is also operable to provide a connection 207 to a location in the memory 204, which holds a sequence number 208. A transmission bus 209 connects the transmission queues 206a–206n to respective transmitters 210a–210n, which transmit data packets from the queues 206a–206n onto the physically diverse paths P1, P2, P3, in response to a control signal provided via a connection 211 to the controller 200.

The destination node 14 includes a controller 300 communicatively coupled via a connection 301 to destination processes 302 (e.g. other protocol layers which send/receive data to/from users or other network nodes). A system bus 303 bi-directionally connects the controller 300 to a memory 304. The bus 303 is operable to provide a connection 305 to memory storage locations 306a–306n, which provide storage for the path queues 32, 34, 36, previously mentioned. The bus 303 is also operable to provide a connection 307 to a location 308 in the memory 304 that holds the expected sequence number; another location 309 in the memory 304 for storing the current packet or an indication thereof such as a memory pointer; and two locations 310, 312 in the memory 304 for the receiving queue 40 and for the holding queue 38, respectively. A receive bus 313 connects a plurality of receivers 314a–314n to the memory locations 306a–306n, for transferring data packets received from the respective physically diverse paths P1, P2, P3 to their respective path queues 32, 34, 36. A connection 315 from the plurality of receivers 314a–314n to the controller 300 provides the controller with an indication as packets are received. The controller 300 further includes timers 316 each of which is for timing a maximum duration that a packet is to remain in the holding queue 38.

Referring again to the source node 12, the controller 200 executes a method which provides coordination for performing the steps of setting up the paths (step 100), tagging packet sequence numbers (step 110), and transmitting the tagged packets (step 120), as described earlier. The steps are performed by the controller 200 along with the other elements of the source node 12 described above. Therefore, the source node 12 has the means for setting up physically diverse paths, tagging packets with sequence numbers, updating the sequence number and inserting it into packets, enqueuing copies of tagged packets onto each path, and transmitting the tagged packets onto the paths, as described earlier with respect to the present method of protection.

Referring again to the destination node 14, the controller 300 executes a method, which provides coordination for performing the steps of setting up the paths (step 100), receiving tagged packets (step 130), and reconstructing traffic (step 140), as described earlier. The steps are performed by the controller 300 along with the other elements of the destination node 14 described above. Therefore, the destination node 14 has the means for setting up physically diverse paths, retrieving packet sequence numbers from received packets, updating the expected sequence number, comparing packet sequence numbers with the expected sequence number, delivering packets from the path queues to the holding queue or receiving queue, delivering packets from the holding queue to the receiving queue, discarding packets, and keeping a timer for a packet in the holding queue 38, as described earlier with respect to the present method of protection.

Numerous alterations, variations and adaptations to the embodiments of the invention described above are possible within the scope of the invention, which is defined by the claims.

What is claimed is:

1. A method of protecting traffic in a mesh network, the method comprising the steps of:

establishing at least two physically diverse paths from a source node to a destination node for transmitting data packets of the traffic;

tagsing, at the source node, each of said data packets with a sequence number;

transmitting, by the source node, the tagged data packets onto the paths;

receiving at a plurality of receivers at the destination node, the data packets transmitted over the paths;

retrieving, the sequence number of data packets received by the destination node;

delivering from a path queue associated with each receiver a data packet to a receiving queue responsive to the sequence number of the first data packet being equal to an expected sequence number;

updating the expected sequence number in accordance with the sequence number of the first data packet; and reconstructing, the data packets in the receiving queues.

2. The method of claim 1 wherein the destination node further includes a holding queue and the step of reconstructing the traffic further comprises the steps of:

delivering a data packet to the holding queue responsive to the sequence number of that data packet being greater than the expected sequence number; and delivering that data packet from the holding queue to the receiving queue responsive to the sequence number of that data packet being equal to the expected sequence number.

3. The method of claim 2 wherein the step of reconstructing further comprises the steps of:

starting a timer for each data packet that is delivered to the holding queue; and delivering, responsive to a timer expiring, the data packet corresponding to the expired timer to the receiving queue.

4. The method of claim 3 wherein the step of reconstructing further comprises the step of discarding a particular data packet from one of the path queues responsive to the sequence number of the particular data packet being less than the expected sequence number, or responsive to the sequence number of the particular data packet in one of the path queues being equal to the sequence number of another data packet in the holding queue.

5. A method of receiving traffic in a mesh network, the method comprising the steps of:
establishing at least two physically diverse paths from a source node to a destination node for carrying data packets of the traffic;
receiving, at respective path queues maintained by the destination node, the data packets transmitted over the paths;
retrieving the sequence number of data packets in the respective paths queues;
delivering a data packet from one of the path queues to a receiving queue responsive to the sequence number of the data packet being equal to an expected sequence number; and
updating the expected sequence number in accordance with the sequence number of the data packet; delivered to the receiving queue from the path queue; and
reconstructing the traffic from the data packets in the receiving queue.

6. The method of claim 5 wherein the destination node further includes a holding queue and the step of reconstructing the traffic further comprises the steps of:
 delivering a data packet to the holding queue responsive to the sequence number of that data packet being greater than the expected sequence number; and
 delivering that data packet from the holding queue to the receiving queue responsive to the sequence number of that data packet being equal to the expected sequence number.

7. The method of claim 6 wherein the step of reconstructing further comprises the steps of:
 starting a timer for each data packet that is delivered to the holding queue; and
 delivering, responsive to the timer expiring, the data packet corresponding to the expired timer from the holding queue to the receiving queue.

8. The method of claim 7 wherein the step of reconstructing further comprises the step of discarding a particular data packet from one of the path queues responsive to the sequence number of the particular data packet being less than the expected sequence number, or responsive to the sequence number of the particular data packet in the path queue being equal to the sequence number of another data packet in the holding queue.

9. A network node for receiving protected traffic carried over physically diverse paths in a mesh network, the node comprising:
 a plurality of receivers, each one of said receivers for connecting to one of the paths and being operable to receive data packets of the traffic in a respective path queue, each of said data packets having a sequence number corresponding to its position in the traffic;
 a controller being operable to maintain an expected sequence number, the expected sequence number corresponding to the position in the traffic of a next data packet to be received; and
 a receiving queue for receiving said data packets from the path queues,
 the controller being operable to cause a particular data packet to be delivered from any one of the path queues to the receiving queue responsive to the particular data packet having a sequence number equal to the expected sequence number.

10. The network node of claim 9 further comprising:
 a holding queue for storing one copy of each data packet having a sequence number greater than the expected sequence number, and wherein the controller is further operable to cause a data packet in the holding queue having a sequence number equal to the expected sequence number to be delivered from the holding queue to the receiving queue.

11. The network node of claim 10 wherein the controller is further operable to maintain a timer for each data packet that is stored in the holding queue, and to cause a particular stored data packet corresponding to an expired timer to be delivered to the receiving queue.

12. The network node of claim 11 wherein the controller is further operable to discard any data packet in a one of the path queues having a sequence number less than the expected sequence number, or having a sequence number equal to the sequence number of a data packet stored in the holding queue.

* * * * *